(12) United States Patent
Ramprashad

(10) Patent No.: US 7,899,059 B2
(45) Date of Patent: Mar. 1, 2011

(54) MEDIA DELIVERY USING QUALITY OF SERVICE DIFFERENTIATION WITHIN A MEDIA STREAM

(75) Inventor: Sean Anthony Ramprashad, Stirling, NJ (US)

(73) Assignee: Agere Systems Inc., Allentown, PA (US)

( * ) Notice: Subject to any disclaimer, the term of this patent is extended or adjusted under 35 U.S.C. 154(b) by 1308 days.

(21) Appl. No.: 10/706,724

(22) Filed: Nov. 12, 2003

(65) Prior Publication Data

US 2005/0100022 A1 May 12, 2005

(51) Int. Cl.
*H04L 12/56* (2006.01)
*H04N 7/12* (2006.01)

(52) U.S. Cl. ............. 370/395.42; 370/468; 375/240.11

(58) Field of Classification Search .................. 370/337, 370/338, 392, 412, 432, 445, 447, 448, 468, 370/469, 229–235, 235.1–238.1, 395.42; 709/227, 230, 246, 238–240; 375/240, 240.15, 375/240.16, 240.19, 240.27; 348/487, 425.2, 348/387.1, 398.1; 725/48, 54, 95, 96, 131, 725/147; 704/500
See application file for complete search history.

(56) References Cited

U.S. PATENT DOCUMENTS 5,768,535 A * 6/1998 Chaddha et al. ............. 709/247
6,266,817 B1 7/2001 Chaddha ..................... 725/146

(Continued)

FOREIGN PATENT DOCUMENTS

JP 9023214 A 1/1997

(Continued)

OTHER PUBLICATIONS

Park et al, "Collaborative QoS Architecture between DiffServ and 802.11e Wireless LAN", pp. 945-949 and abstract, IEEE, Apr. 2003.*

(Continued)

*Primary Examiner*—Aung S Moe
*Assistant Examiner*—Habte Mered
(74) *Attorney, Agent, or Firm*—Mendelsohn, Drucker & Associates, P.C.; Yuri Gruzdkov; Steve Mendelsohn

(57) ABSTRACT

A WLAN system adapted to apply QoS differentiation to a media stream to be transmitted from a transmitting station (STA) to a receiving STA of that system. The transmitting STA processes the media stream to generate a base sub-stream and one or more enhancement sub-streams for subsequent transmission over a wireless communication channel and assigns different priorities to different sub-streams. Depending on the channel conditions, the transmitting STA may select to discard, without transmission, portions of data from enhancement sub-streams. The selection process is based on the assigned priority and operates to preserve as much of relatively high-priority data as possible. The receiving STA then processes the received data to generate a reconstructed media stream, which provides signal quality equal to or better than the signal quality supported by the base sub-stream. Advantageously, a WLAN system of the invention is adapted to change signal quality dynamically and incrementally in a manner commensurate with current channel conditions without the need for communication between the higher and lower network layers. In addition, it provides gradual and graceful degradation of signal quality when channel conditions deteriorate as opposed to abrupt degradation inherent in analogous prior art systems.

29 Claims, 4 Drawing Sheets

U.S. PATENT DOCUMENTS

| | | | |
|---|---|---|---|
| 6,526,177 B1 | 2/2003 | Haskell et al. | 382/243 |
| 6,798,838 B1 * | 9/2004 | Ngo | 375/240.19 |
| 6,865,609 B1 * | 3/2005 | Gubbi et al. | 709/230 |
| 6,879,634 B1 * | 4/2005 | Oz et al. | 375/240.26 |
| 6,898,313 B2 * | 5/2005 | Li et al. | 382/176 |
| 7,116,717 B1 * | 10/2006 | Eshet et al. | 375/240.25 |
| 7,194,000 B2 * | 3/2007 | Balachandran et al. | 370/395.42 |
| 7,269,184 B2 * | 9/2007 | Kobayashi | 370/468 |
| 2002/0089994 A1 * | 7/2002 | Leach et al. | 370/412 |
| 2004/0052257 A1 * | 3/2004 | Abdo et al. | 370/392 |
| 2005/0036448 A1 * | 2/2005 | Leeuwen | 370/235 |
| 2005/0047425 A1 * | 3/2005 | Liu et al. | 370/411 |

FOREIGN PATENT DOCUMENTS

| | | | |
|---|---|---|---|
| JP | 20000286893 A | 10/2000 | |
| JP | 2003-309573 A | 10/2003 | |
| WO | WO 01/065848 A1 | 9/2001 | |
| WO | WO 02/091743 A2 | 11/2002 | |
| WO | WO 2004/109981 A1 | 6/2004 | |

OTHER PUBLICATIONS

S. Rajesh et al, "QoS Algorithms for IEEE 802.11e Implementation", IEEE, Sep. 2003.*

S. Choi et al "IEEE 802.11e Contention-Based Channel Access (ECF) Performance Evaluation", IEEE, May 2003.*

IEEE Std 802 11e/D3.0, IEEE, May 2002.*

"A Joint Source Coding and Networking Scheme for Video Streaming Over Wireless LANs," by Hong Man et al., Proceedings, ITRE 2003, International Conference on Information Technology Research and Education, XP010684973, Aug. 11, 2003, pp. 60-64.

"A Scheduling Algorithm for Relative Delay Differentiation," Bodamer et al., Proceedings of the IEEE Conference 2000 on High Performance Switching and Routing, Heidelberg, Germany, Jun. 26-29, 2000, Proceedings of the IEEE on High Performance Switching and Routing, New York, NY, IEEE, US, Jun. 26, 2000, XP001075722, pp. 357-364.

"A Two Stage Hybrid Embedded Speech/Audio Coding Structure," by Sean A. Ramprashad, 0-7803-4428-6/98, 1998 IEEE, pp. 337-340.

"High Quality Embedded Wideband Speech Coding Using an Inherently Layered Coding Paradigm," by Sean A. Ramprashad, 07-7803-6293-4/00, 2000 IEEE, pp. 1145-1148.

"Draft Supplement to Standard for 2 Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)," IEEE Computer Society, IEEE Std 802.11e/D4.0, Nov. 2002, (143 pages).

Office Action dated Jun. 16, 2010 received in JP 2004-328327.

* cited by examiner

MEDIA DELIVERY USING QUALITY OF SERVICE DIFFERENTIATION WITHIN A MEDIA STREAM

BACKGROUND OF THE INVENTION

1. Field of the Invention

The present invention relates to communication equipment and, more specifically, to equipment for wireless local area networks (WLANs).

2. Description of the Related Art

IEEE Standard 802.11 has emerged as a prevailing technology for broadband access in WLAN systems and is regarded by many as a wireless version of Ethernet. The 802.11 legacy medium access control (MAC) is based upon best-effort service, which does not support quality of service (QoS) for users or applications. However, the increasing demand for streaming media (e.g., voice and video) transmissions, which typically have certain QoS requirements, prompted the 802.11 Working Group to begin work on an extension to the standard. The upcoming 802.11e supplement standard will define enhancements to the legacy 802.11 MAC providing a QoS support facility.

Draft standard 802.11e (version D4.0 of November, 2002), the teachings of which are incorporated herein by reference, provides two mechanisms for the support of applications with QoS requirements. The first mechanism, designated as Enhanced Distributed Coordination Function (EDCF), is based on differentiating priorities at which data traffic is to be delivered. The second mechanism allows for scheduling of transmission opportunities with the hybrid coordinator located at the access point (AP) of the WLAN. Various time-sharing schemes between the two mechanisms are also possible.

The EDCF is based on eight priority values, designated 0 to 7, which are analogous to IEEE 802.1d priority tags. Each data packet to be transmitted is provided with a priority value, based on which the packet is sorted into one of the following four access categories (ACs): best effort, video probe, video, and voice. Each AC contends for access to the wireless medium based on the corresponding QoS parameter set (PS) including, for example, the values of (i) CWmin and CWmax specifying the contention window and (ii) arbitration inter-packet spacing. After winning a contention, an AC is allowed to transmit one or more packets in addition to the first packet without having to re-contend for access to the wireless medium for the transmission of the additional packets. Such transmission of multiple packets is referred to as data bursting.

FIG. 1 shows a block diagram of a representative WLAN system 100 having two prior-art 802.11e-compliant stations (STAs) 102 and 112 communicating over a wireless communication channel 122. For illustration purposes, STA 102 is a transmitting station and STA 112 is a receiving station. Four data streams S0-S3 corresponding to four access categories AC-n, where n=0, 1, 2, 3, are applied to STA 102. For each AC, STA 102 has a corresponding buffer 104-n configured to queue data to be transmitted over channel 122 using a transmitter 108. A controller 106 of STA 102 implements 802.11e MAC functions to govern application of data from buffers 104-n to transmitter 108. More specifically, controller 106 is adapted to treat each AC-n as a separate EDCF contending entity having its own QoS parameter set (PS[n]) and maintaining its own back-off counter (BC[n]). When more than one AC-n of STA 102 finish their back-off procedures at the same time, controller 106 resolves any collision between those ACs using a virtual collision handler (VCH) in favor of the AC having the highest priority. For example, if the collision occurs between the video and best-effort ACs, the video AC wins the contention and is given access to transmitter 108. At STA 112, a receiver 118 receives transmissions from STA 102 and a processor 116 processes the output of receiver 118 to generate four data streams S0'-S3' corresponding to data streams S0-S3.

One problem with system 100 is that transmission of a given media stream, e.g., stream S0, is relatively difficult to adapt to the fluctuating conditions of channel 122. For example, a representative prior-art adaptation technique involves bit-rate adjustment at a source coder (not shown) that generates stream S0. This requires communication between the higher and lower network layers embodied by the source coder and processor 106, respectively, which increases the overall complexity of the WLAN system and adds latency to its operation. In the absence of such communication, STA 102 reacts to "bad-channel" conditions by dropping a certain number of data packets, which may result in unpredictable fluctuations of signal quality.

SUMMARY OF THE INVENTION

Problems in the prior art are addressed, in accordance with the principles of the present invention, by a WLAN system adapted to apply QoS differentiation to a media stream to be transmitted from a transmitting station (STA) to a receiving STA of that system. The transmitting STA (or application) processes the media stream to generate a base sub-stream and one or more enhancement sub-streams for subsequent transmission over a wireless communication channel and assigns different priorities to different sub-streams. Depending on the channel conditions, the transmitting STA may select to discard, without transmission, portions of data from enhancement sub-streams. The selection process is based on the assigned priority and operates to preserve as much of relatively high-priority data as possible. The receiving STA then processes the received data to generate a reconstructed media stream, which provides signal quality equal to or better than the signal quality supported by the base sub-stream. Advantageously, a WLAN system of the invention is adapted to change signal quality dynamically and incrementally in a manner commensurate with current channel conditions without the need for communication between the higher and lower network layers. In addition, it provides gradual and graceful degradation of signal quality when channel conditions deteriorate as opposed to abrupt degradation inherent in analogous prior art systems.

According to one embodiment, the present invention is a method of processing data streams in a contention-based WLAN system, the method comprising: (A) generating two or more sub-streams corresponding to a first data stream; (B) assigning priority to each sub-stream, wherein at least two sub-streams have different priorities; and (C) transmitting data corresponding to each sub-stream based on the assigned priority.

According to another embodiment, the present invention is, at a transmitting station in a contention-based WLAN system, apparatus adapted to process data streams, the apparatus comprising: (A) a device adapted to generate two or more sub-streams corresponding to a first data stream; and (B) a controller coupled to a transmitter, wherein: the transmitter is adapted to transmit data corresponding to the two or more sub-streams; and the controller is adapted to (i) assign priority to each sub-stream, wherein at least two sub-streams have different priorities and (ii) apply sub-stream data to the transmitter based on the assigned priority.

According to yet another embodiment, the present invention is, at a receiving station in a contention-based WLAN system, apparatus adapted to generate an output data stream corresponding to a first data stream applied to a transmitting station in said system, the apparatus comprising: (A) a processor coupled to a receiver, the processor adapted to generate two or more sub-streams corresponding to data received by the receiver from the transmitting station; and (B) a first device coupled to the processor and adapted to process the two or more sub-streams generated by the processor to generate the output data stream, wherein the transmitting station comprises: (i) a second device adapted to generate two or more sub-streams corresponding to the first data stream; and (ii) a controller coupled to a transmitter, wherein: the transmitter is adapted to transmit data corresponding to the two or more sub-streams generated by the second device; and the controller is adapted to (i) assign priority to each sub-stream generated by the second device, wherein at least two of said sub-streams have different priorities and (ii) apply sub-stream data to the transmitter based on the assigned priority.

According to yet another embodiment, the present invention is a contention-based WLAN system, comprising a transmitting station and a receiving station, wherein: the transmitting station is adapted to: generate two or more sub-streams corresponding to a first data stream; assign priority to each sub-stream, wherein at least two sub-streams have different priorities; and transmit data corresponding to the two or more sub-streams based on the assigned priority; and the receiving station is adapted to: generate two or more sub-streams corresponding to data received from the transmitting station; and process said two or more generated sub-streams to generate an output data stream corresponding to the first data stream.

According to yet another embodiment, the present invention is, for a wireless network that supports priority-based transmission of data streams, a transmitting station capable of transmitting one or more data streams, wherein the transmitting station is capable of: for at least one data stream, generating two or more sub-streams corresponding to said data stream, each sub-stream having a different assigned priority level; and transmitting the two or more sub-streams based on the assigned priority levels, wherein, the transmitting station is adapted to selectively drop one or more sets of data in one or more sub-streams having relatively low priority levels when warranted by existing transmission characteristics.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
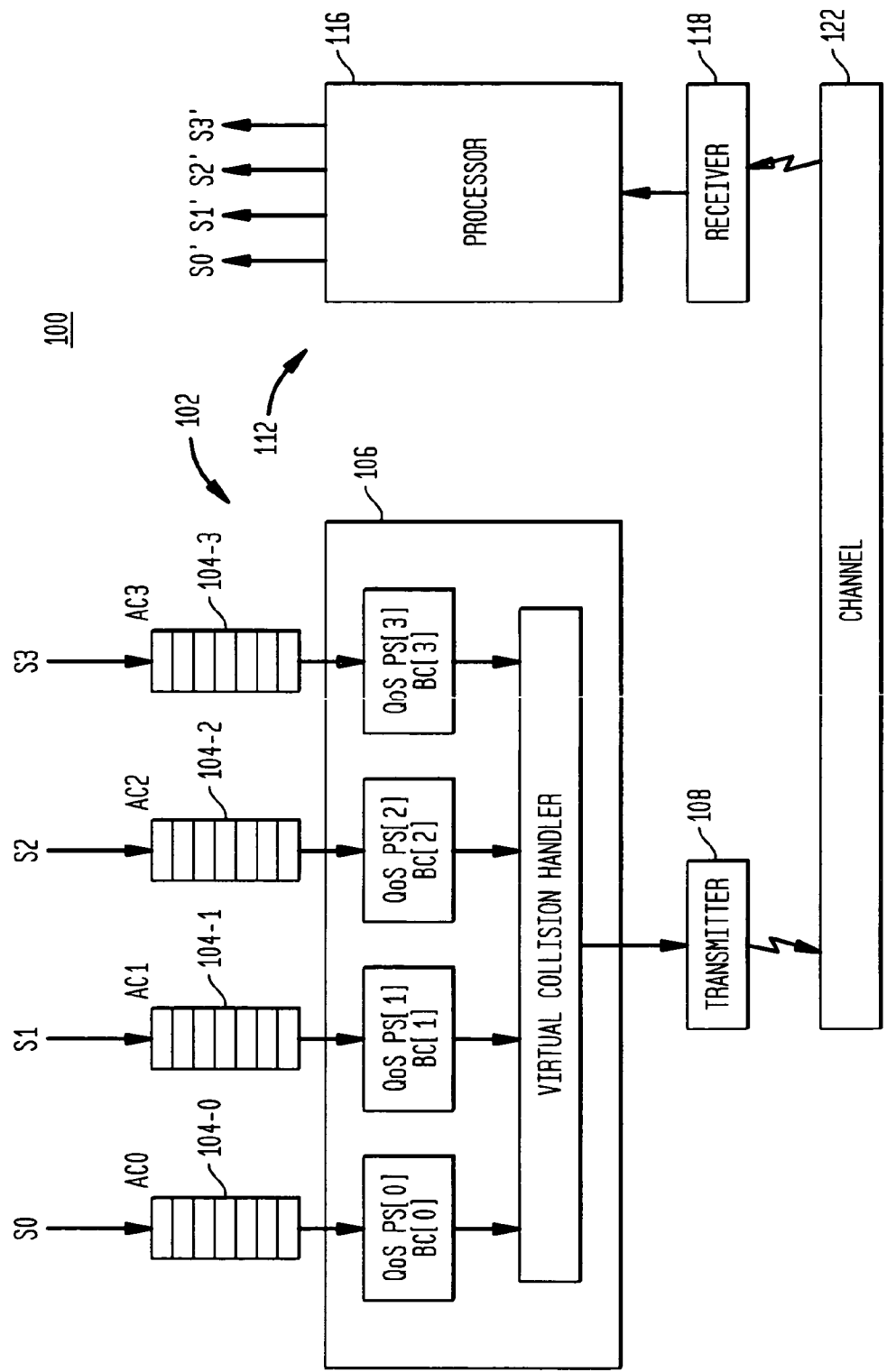
FIG. 1 shows a block diagram of a representative WLAN system having two prior-art 802.11e-compliant stations (STAs) communicating over a wireless communication channel.
Figure 2:
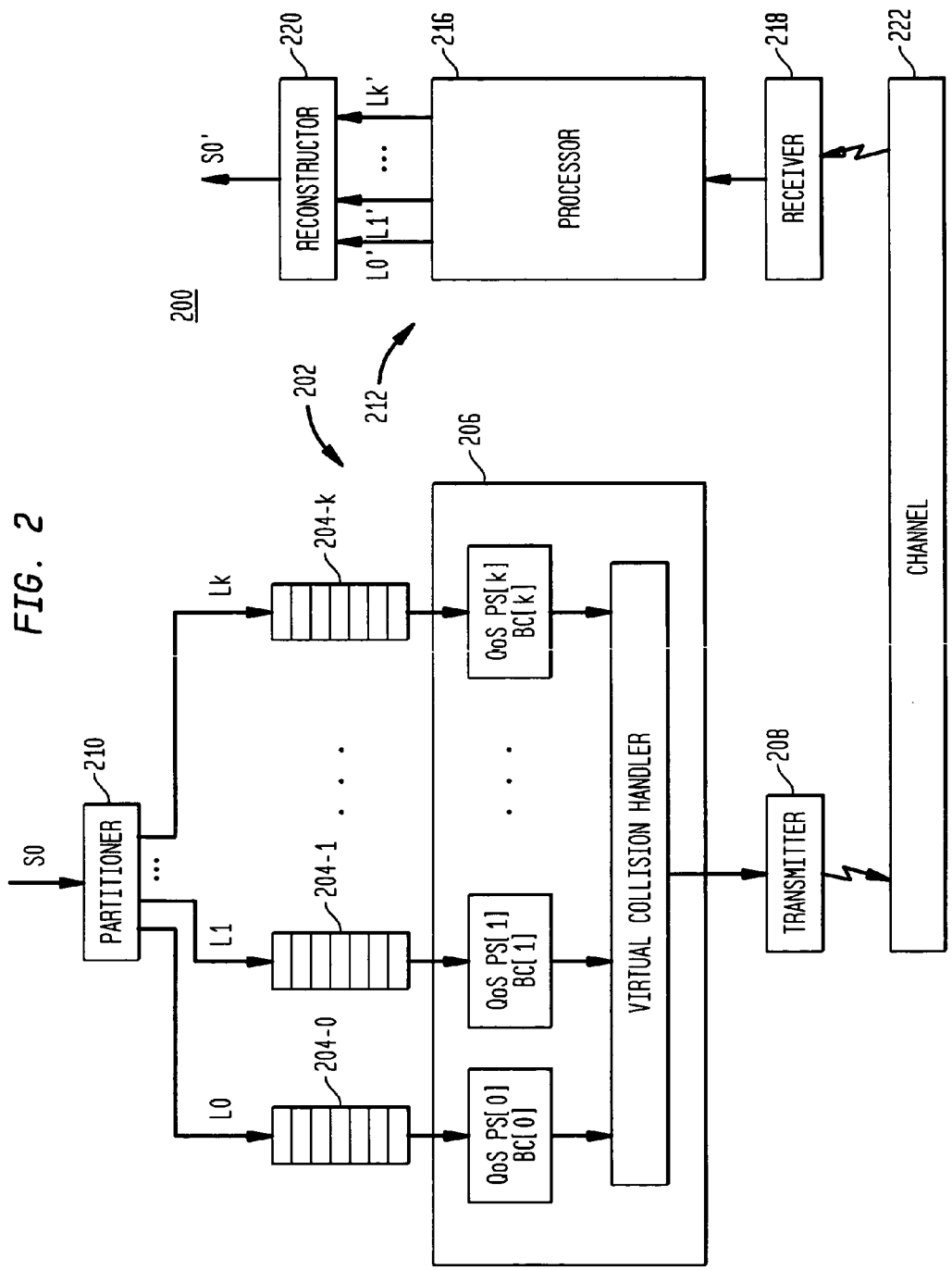
FIG. 2 shows a block diagram of a WLAN system according to one embodiment of the present invention.

FIG. 2 shows a block diagram of a WLAN system 200 according to one embodiment of the present invention. System 200 has two 802.11e-compliant stations (STAs) 202 and 212 communicating over a wireless communication channel 222. For illustration purposes, STA 202 is a station adapted to process data stream S0 generated by an external coder (not shown) for transmission over channel 222, and STA 212 is a station adapted to receive over that channel transmissions from STA 202 and to generate data stream S0' corresponding to stream S0. In contrast to STA 102 of system 100 which assigns a single priority to each data stream, STA 202 of system 200 partitions stream S0 into two or more sub-streams and assigns different priorities to different sub-streams to provide additional degrees of freedom when the system needs to dynamically adapt to the fluctuating conditions of channel 222.

The following description illustrates operation principles of system 200 using an exemplary embodiment of the system adapted to process an MPEG-2 video stream S0, which is an example of a broader class of hierarchical streams. One characteristic of a hierarchical stream is that it lends itself to relatively straightforward partitioning into sub-streams based on the stream's hierarchy. Such partitioning substantially involves (i) reorganizing the data already present in the stream and (ii) appropriately distributing the reorganized data between sub-streams. For example, relevant MPEG-2 hierarchy levels that may be used for such partitioning are: (1) sequence and group of picture headers; (2) picture headers; (3) slice headers; (4) macro-block data (e.g., motion vectors); and (5) block data (e.g., discrete cosine transform (DCT) coefficients). More details on the MPEG-2 hierarchy can be found, for example, in International Standard ISO/IEC 13818-2, the teachings of which are incorporated herein by reference.

In system 200, video stream S0 is applied to a partitioner 210 adapted to divide stream S0 into k+1 (k≧1) layers (sub-streams) L0-Lk using partitioning based on division of DCT data. The principles of such partitioning are described, for example, in the ISO/IEC 13818-2 standard. Briefly, layer L0 is a base layer and each of layers L1-Lk is an enhancement layer. Base layer L0 can be decoded independently, while each of enhancement layers L1-Lk can only be decoded using the information contained in the corresponding lower layers. For example, enhancement layer L2 is decoded using the information contained in layers L0 and L1. Progressive addition of information from a next enhancement layer to the information from the layers below that enhancement layer incrementally increases quality of the reconstructed video sequence. One skilled in the art will appreciate that other partitioning schemes can similarly be employed.

The ISO/IEC 13818-2 standard provides one partitioning mode and three primary scalable-coding methods (i.e., data partitioning, signal-to-noise ratio (SNR) scalability, spatial scalability, and temporal scalability) and several hybrid methods, each of which combines two primary scalable-coding methods. Representative coders that can be used as partitioner 210 in STA 202 are disclosed in the ISO/IEC 13818-2 standard and in U.S. Pat. Nos. 6,526,177 and 6,266,817, the teachings of both of which are incorporated herein by reference. One skilled in the art will readily appreciate that other partitioning methods not described in the standard, e.g., into picture type differentiating I-, P-, and B-frames, can also be used.

For each layer (L0-Lk), STA 202 has a corresponding buffer 204 configured to queue data to be transmitted over channel 222 using a transmitter 208. Similar to controller 106 of STA 102, a controller 206 of STA 202 controls application of data from buffers 204 to transmitter 208 by assigning different priorities to different layers. Controller 206 then treats each layer as a separate EDCF contending entity (i.e., a virtual station) having the assigned QoS parameter set (PS[i], i=0, 1, ... k) and maintaining its own back-off counter (BC[i]). When more than one layer of STA 202 finish their back-off procedures at the same time, controller 206 resolves the collision using a VCH similar to the VCH of STA 102.

In a preferred configuration, highest priority is assigned to base layer L0 and priority decreases as the layer number increases. For example, in one configuration, controller 206 sets priority by assigning: (I) to layers L0-L2, QoS parameter sets corresponding to the voice, video, and video probe ACs, respectively, of system 100 and (II) to all subsequent layers (if any), QoS parameter sets corresponding to the best effort AC of system 100. In another configuration, controller 206 sets priority by assigning 802.11e priority values and custom-defined QoS parameter sets to one or more layers, for example, by setting desired values for (i) CWmin and CWmax, (ii) arbitration inter-frame spacing (AIFS), and (iii) burst sizes.

Due to different priorities, data corresponding to different layers will on average spend different amounts of time in the corresponding buffers before an appropriate transmission opportunity is presented to the layer. For example, due to higher priority of base layer L0 with respect to enhancement layer L1, the average retention time in buffer 204-0 of data corresponding to base layer L0 will be shorter than the average retention time in buffer 204-1 of data corresponding to enhancement layer L1. Similarly, the average retention time in buffer 204-1 of data corresponding to enhancement layer L1 will be shorter than the average retention time in buffer 204-k of data corresponding to enhancement layer Lk, where k>1. STA 202 uses this retention-time differentiation to dynamically adjust its data transmission volume to correspond to the current conditions of channel 222. More specifically, when a particular data packet is retained for a relatively long period of time due to relatively poor channel conditions, the packet is discarded without transmission. Since packets corresponding to relatively low-priority layers have relatively long retention times, a relatively large proportion of those packets will be discarded in "bad channel" conditions.

To determine which data packets to discard, controller 206 maintains, for each data packet queued in buffers 204, an individual timer having a threshold value. Preferably, different timers corresponding to the same buffer have identical threshold values, while timers corresponding to different buffers have different threshold values. In one configuration, a timer starts when the corresponding packet is queued into the buffer. If the timer reaches its threshold value before the packet can be transmitted, then the packet is purged from the buffer without being applied to transmitter 208. In another configuration, the timer for an enhancement packet starts when the base packet corresponding to that enhancement packet is transmitted. Consequently, the enhancement packet is discarded when the transmission delay for that packet with respect to the base packet exceeds the corresponding threshold value.

At STA 212, a receiver 218 receives transmissions from STA 202 and a processor 216 processes the output of receiver 218 to generate k+1 sub-streams L0'-Lk' corresponding to layers L0-Lk. A reconstructor 220 then properly combines sub-streams L0'-Lk' to generate video stream S0' corresponding to video stream S0. Reconstructor 220 is optionally adapted to use a concealment technique as known in the art to mitigate loss of data corresponding to stream S0. Representative decoders that can be used as reconstructor 220 in STA 202 are disclosed in the above-cited U.S. Pat. Nos. 6,526,177 and 6,266,817. In addition, the ISO/IEC 13818-2 standard itself provides a method of reconstruction including the step of discarding in a certain manner portions of layers L'k, k>1.

As already indicated above, to adapt to the fluctuating channel conditions, system 100 requires communication between higher and lower network layers embodied by a source coder and processor 106, respectively, which communication adds complexity to the system. In the absence of such communication, STA 102 reacts to "bad-channel" conditions by dropping data packets, which results in lapses in the received video sequence and/or unpredictable and/or abrupt degradation of video quality. In contrast, system 200 does not require communication between the higher and lower network layers and, yet, has the capacity for adaptively following channel conditions. More specifically, as already indicated above, system 200 reacts to "bad-channel" conditions by dropping portions of one or more enhancement sub-streams in the order of priority. For example, when the channel conditions begin to deteriorate the sub-stream having the lowest priority is dropped first, the sub-stream having the next lowest priority is dropped second, etc. As a result, video quality decreases gradually down to the quality level supported by the base sub-stream. No lapses in the received video sequence will occur as long as the base sub-stream is being received without interruption. As channel conditions improve, the dropped sub-streams are sequentially added back in to regain the original video quality. Thus, advantageously, system 200 provides gradual and graceful degradation of quality as opposed to unpredictable and/or abrupt degradation typical to system 100.

Figure 3:
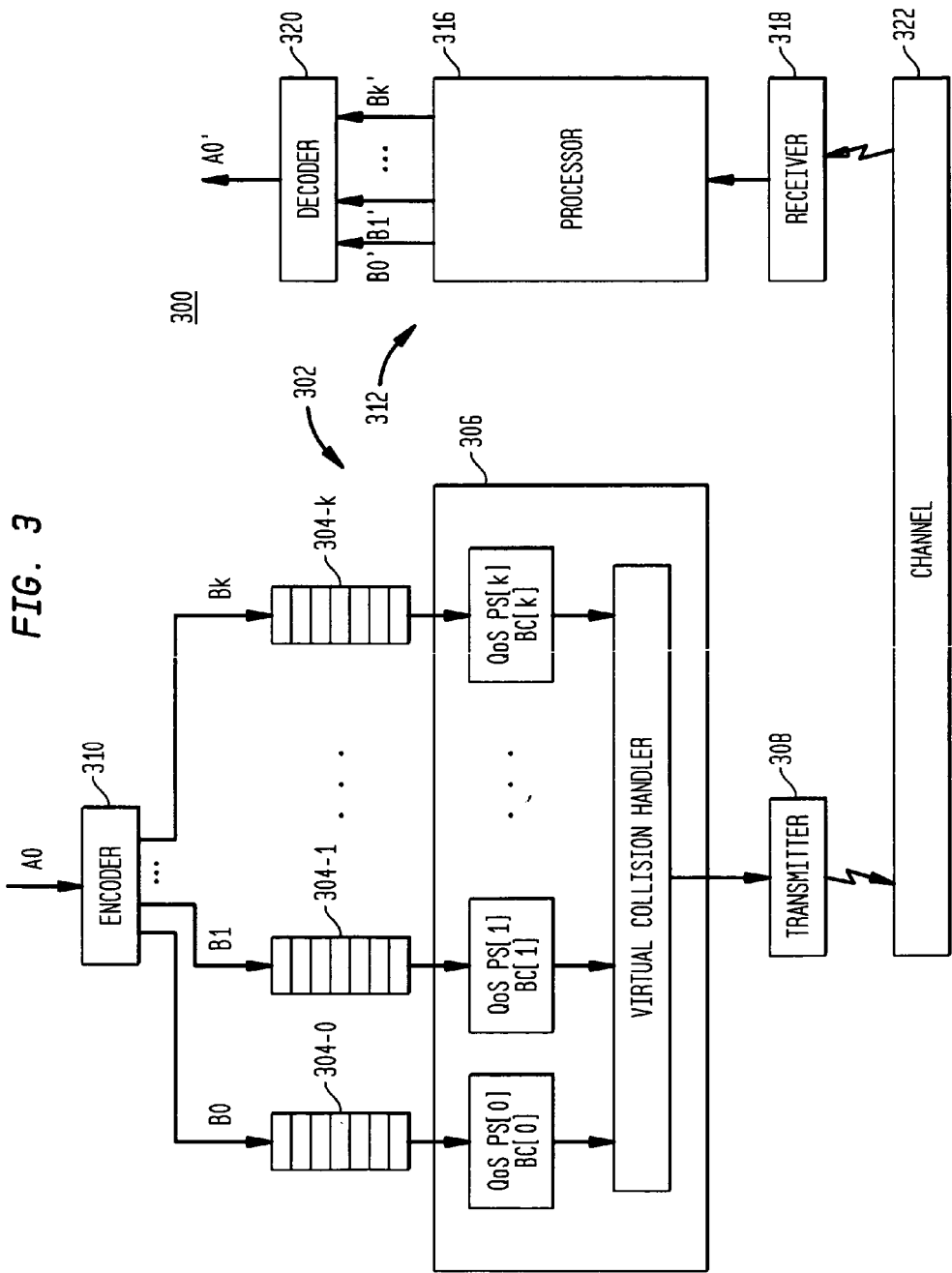
FIG. 3 shows a block diagram of a WLAN system according to another embodiment of the present invention.

FIG. 3 shows a block diagram of a WLAN system 300 according to another embodiment of the present invention. System 300 is similar to system 200 and has two 802.11e-compliant stations 302 and 312 communicating over a wireless communication channel 322. However, one difference between systems 300 and 200 is that stream A0 applied to STA 302 is an embedded data stream that is divided into sub-streams by the source coder. One example of such data stream is an uncompressed audio stream, wherein the sub-streams are either LEFT and RIGHT channels or LEFT+RIGHT (SUM) and LEFT−RIGHT (DIFFERENCE) channels. Other examples of such data streams are compressed speech, audio, and/or video streams generated by an embedded coder. Yet more examples of such data streams are streams generated by scalable video coders. In the art, the term "scalable" is often used interchangeably with the term "embedded", although oftentimes the term "scalable" simply refers to the fact that the bit-rate is adjustable. One situation in which these terms are truly interchangeable is the situation of the "scalable modes" described in the ISO/IEC 13818-2 standard.

The following description explains operation principles of system 300 using, as an example, a configuration adapted to process an audio stream. One skilled in the art will readily appreciate that a different embedded stream may similarly be processed.

Audio stream A0 is applied to an embedded encoder 310 of STA 302 adapted to generate k+1 (k≧1) layers B0-Bk using a selected embedded coding algorithm. Layers B0-Bk are analogous to layers L0-Lk of system 200 in that adding information from upper layers improves audio signal quality corresponding to reconstructed stream A0'. Preferably, encoder 310 is implemented to attain the following characteristics: (1) parameterization of stream A0 and parameter allocation between base and enhancement layers is devised to provide acceptable signal quality with base layer B0 alone; (2) decoding of the base layer alone without enhancement layers is a priori accommodated by the design of the encoder and decoder; (3) enhancement layers can only be decoded with the base layer and are produced with the assumption that the base layer will be available; and (4) addition of information from an enhancement layer to that from the preceding layers improves signal quality. When the base layer is lost, the decoder operates by using a concealment algorithm targeting the interval in time/space/location corresponding to the lost signal. Representative encoders that can be used as encoder 310 in STA 302 are disclosed in (1) "High Quality Embedded Wideband Speech Coding Using an Inherently Layered Coding Paradigm" by Ramprashad, S. A.; Proceedings of the 2000 IEEE International Conference on Acoustics, Speech, and Signal Processing, Vol. 2 Pages III1145-III1148 and (2) "A Two Stage Hybrid Embedded Speech/Audio Coding Structure" by Ramprashad, S. A.; Proceedings of the 1998 IEEE International Conference on Acoustics, Speech, and Signal Processing, Vol. 1, Pages 337-340, the teachings of which are incorporated herein by reference.

Subsequent processing of layers B0-Bk in STA 302 is similar to the processing of layers L0-Lk in STA 202 (FIG. 2). More specifically, for each layer (B0-Bk), STA 302 has a corresponding buffer 304 configured to queue data to be transmitted over channel 322 using a transmitter 308. A controller 306 controls application of data from buffers 304 to transmitter 308 by assigning different priorities to different layers. Controller 306 then treats each layer as a separate EDCF contending entity having the assigned QoS parameter set and maintaining its own back-off counter, wherein collisions between layers are resolved using a VCH. Similar to controller 206, controller 306 maintains an individual timer for each data packet queued in buffers 304. A packet is discarded if its timer reaches a threshold value before the packet can be transmitted.

At STA 312, a receiver 318 receives transmissions from STA 302 and a processor 316 processes the output of receiver 318 to generate k+1 sub-streams B0'-Bk' corresponding to layers B0-Bk. A decoder 320 then processes sub-streams B0'-Bk' by substantially applying a transform inverse to that applied in encoder 310 to generate audio stream A0' corresponding to audio stream A0. Representative decoders that can be used as decoder 330 in STA 312 are disclosed in the above-cited references (1) "High Quality Embedded Wideband Speech Coding Using an Inherently Layered Coding Paradigm" by Ramprashad, S. A.; Proceedings of the 2000 IEEE International Conference on Acoustics, Speech, and Signal Processing, Vol. 2 Pages III1145-III1148 and (2) "A Two Stage Hybrid Embedded Speech/Audio Coding Structure" by Ramprashad, S. A.; Proceedings of the 1998 IEEE International Conference on Acoustics, Speech, and Signal Processing, Vol. 1, Pages 337-340 and, also, in the ISO/IEC 13818-2 standard.

Similar to system 200 (FIG. 2), system 300 reacts to fluctuating channel conditions by dropping/adding one or more enhancement layers in some selected order and preferably in the order of priority. Thus, system 300 dynamically and incrementally changes signal quality in a manner commensurate with the current channel conditions, which is advantageously different from abrupt signal quality fluctuations in system 100.

Figure 4:
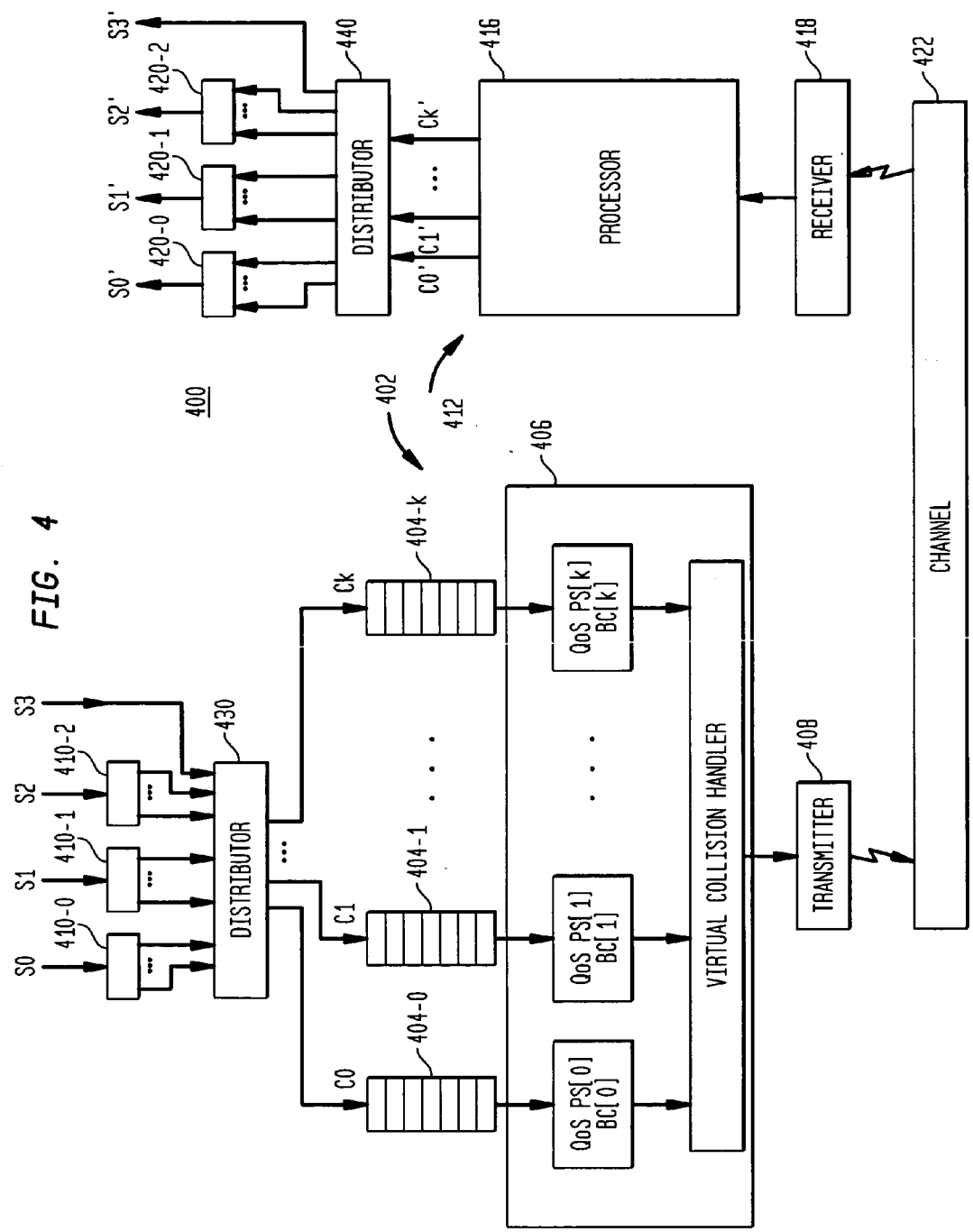
FIG. 4 shows a block diagram of a WLAN system according to yet another embodiment of the present invention.

FIG. 4 shows a block diagram of a WLAN system 400 according to yet another embodiment of the present invention. System 400 is similar to systems 200 and 300 and has two 802.11e-compliant stations 402 and 412 communicating over a wireless communication channel 422. However, one difference between system 400 and systems 200 and 300 is that system 400 is adapted to process multiple data streams compared to one stream in each of systems 200 and 300. In system 400, one or more data streams are processed to form layers, which are then transmitted using QoS priority differentiation, and the remaining streams are transmitted without QoS priority differentiation.

In the embodiment shown in FIG. 4, system 400 has four data streams S0-S3, three of which (streams S0-S2) are subjected to layering processing. For each of streams S0-S2, system 400 has a corresponding layering device 410. Depending on the stream type, the corresponding device 410 is either a partitioner similar to partitioner 210 (FIG. 2) or an embedded encoder similar to encoder 310 (FIG. 3). Outputs of devices 410 are connected to a distributor switch 430, which routes data packets corresponding to different layers to buffers 404 assigned to those layers, wherein a particular buffer 404-j may receive packets corresponding to two or more different data streams. In addition, data stream S3 is applied directly to switch 430 and is routed to the buffer 404 to which that stream is assigned.

Subsequent processing in STA 402 of data packets stored in buffers 404 is similar to that implemented, e.g., in STA 302 (FIG. 3). More specifically, a controller 406 controls application of data from buffers 404 to a transmitter 408. At STA 412, a receiver 418 receives transmissions from STA 402 and a processor 416 processes the output of receiver 418 to generate packet streams corresponding to the packet streams applied to transmitter 408 by individual buffers 404-0-404-k. A distributor switch 440 then de-multiplexes those packet streams into appropriate sub-streams corresponding to the layers generated by devices 410 of STA 402. Each layer is then applied to a corresponding decoding device 420, which, depending on the stream type, is either a reconstructor similar to reconstructor 220 (FIG. 2) or a decoder similar to decoder 320 (FIG. 3). Each decoding device 420-m applies processing inverse to that applied in layering device 410-m to generate the corresponding reconstructed stream Sm', where m=0, 1, 2. In addition, distributor switch 440 has a dedicated output corresponding to stream S3'.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. A method of processing data streams in a contention-based WLAN system, the method comprising:
   (A) generating two or more sub-streams corresponding to a first data stream, wherein the two or more sub-streams comprise a base sub-stream and at least one enhancement sub-stream;
   (B) assigning priority to each of the two or more sub-streams, wherein at least two of said base and enhancement sub-streams have different priorities; and
   (C) transmitting data corresponding to each of the two or more sub-streams based on the assigned priority, wherein:
      the contention-based WLAN system conforms to an IEEE 802.11e standard and supports a quality of service (QoS) facility; and
      the step of assigning comprises:
         assigning to said at least two of said base and enhancement sub-streams QoS parameter sets corresponding to at least two different access categories of the IEEE 802.11e standard;
         assigning to the base sub-stream a QoS parameter set corresponding to a voice access category of the IEEE 802.11e standard;
         assigning to a first enhancement sub-stream a QoS parameter set corresponding to a video access category of the IEEE 802.11e standard;
         if there is a second enhancement sub-stream, then assigning to the second enhancement sub-stream a QoS parameter set corresponding to a video probe access category of the IEEE 802.11e standard; and
         if there is a third enhancement sub-stream, then assigning to the third enhancement sub-stream a QoS parameter set corresponding to a best effort access category of the IEEE 802.11e standard.

2. The method of claim 1, wherein the first data stream is a hierarchical stream and step (A) comprises partitioning the hierarchical stream based on the hierarchy of said stream to produce the two or more sub-streams.

3. The method of claim 1, wherein the first data stream is an embedded stream and step (A) comprises generating the two or more sub-streams using an embedded encoder.

4. The method of claim 1, further comprising, for each sub-stream, accumulating data corresponding to the sub-stream in a corresponding transmission queue.

5. The method of claim 4, further comprising, for each queued data packet, (i) running a timer having a threshold value and (ii) discarding the data packet without transmission, when the timer reaches the threshold value.

6. The method of claim 5, wherein, for each enhancement packet, the timer starts when a corresponding base packet is transmitted.

7. The method of claim 5, wherein timers corresponding to different queues have different threshold values.

8. The method of claim 1, wherein step (B) comprises, for each of the two or more sub-streams, selecting parameters of a corresponding QoS parameter set.

9. The method of claim 1, further comprising:
   (D) generating two or more sub-streams corresponding to the transmitted data; and
   (E) processing the sub-streams of step (D) to generate an output data stream corresponding to the first data stream.

10. The method of claim 1, further comprising:
    generating two or more sub-streams corresponding to a second data stream, wherein said two or more sub-streams corresponding to the second data stream comprise a corresponding base sub-stream and at least one corresponding enhancement sub-stream;
    assigning priority to each of said sub-streams corresponding to the second data stream; and
    for each of the two or more sub-streams corresponding to the first data stream and the two or more sub-streams corresponding to the second data stream, accumulating data corresponding to the sub-stream in a corresponding transmission queue, wherein at least one of said transmission queues receives sub-stream data corresponding to each of the first and second data streams.

11. The method of claim 10, wherein at least one sub-stream corresponding to the first data stream and at least one sub-stream corresponding to the second data stream have the same priority.

12. The method of claim 1, wherein:
    the base sub-stream is decodable independently; and
    each of said enhancement sub-streams is decodable based on data contained in the base sub-stream.

13. At a transmitting station in a contention-based WLAN system, apparatus that processes data streams, the apparatus comprising:
    (A) a device that generates two or more sub-streams corresponding to a first data stream, wherein the two or more sub-streams comprise a base sub-stream and at least one enhancement sub-stream; and
    (B) a controller coupled to a transmitter, wherein:
       the transmitter transmits data corresponding to the two or more sub-streams;
       the controller (i) assigns priority to each of the two or more sub-streams, wherein at least two of said base and enhancement sub-streams have different priorities and (ii) applies sub-stream data to the transmitter based on the assigned priority;
       the contention-based WLAN system conforms to an IEEE 802.11e standard and supports a quality of service (QoS) facility; and
       the controller further:
          assigns to said at least two of said base and enhancement sub-streams QoS parameter sets corresponding to at least two different access categories of the IEEE 802.11e standard;
          assigns to the base sub-stream a QoS parameter set corresponding to a voice access category of the IEEE 802.11e standard;

assigns to a first enhancement sub-stream a QoS parameter set corresponding to a video access category of the IEEE 802.11e standard;

if there is a second enhancement sub-stream, then assigns to the second enhancement sub-stream a QoS parameter set corresponding to a video probe access category of the IEEE 802.11e standard; and if there is a third enhancement sub-stream, then assigns to the third enhancement sub-stream a QoS parameter set corresponding to a best effort access category of the IEEE 802.11e standard.

14. The apparatus of claim 13, wherein the first data stream is a hierarchical stream and the device comprises a partitioner that generates the two or more sub-streams based on the hierarchy of said stream.

15. The apparatus of claim 13, wherein the first data stream is an embedded stream and the device comprises an embedded encoder that generates the two or more sub-streams based on scalable coding.

16. The apparatus of claim 13, further comprising, for each sub-stream, a buffer that queues data corresponding to the sub-stream before application to the transmitter.

17. The apparatus of claim 16, the controller, for each queued data packet, (i) runs a timer having a threshold value and (ii) instructs the corresponding buffer to discard the data packet without application to the transmitter, when the timer reaches the threshold value.

18. The apparatus of claim 17, wherein, for each enhancement packet, the timer starts when a corresponding base packet is transmitted.

19. The apparatus of claim 17, wherein timers corresponding to different buffers have different threshold values.

20. The apparatus of claim 13, wherein the controller, for each of the two or more sub-streams, selects parameters of a corresponding QoS parameter set.

21. The apparatus of claim 13, further comprising:
a device that generates two or more sub-streams corresponding to a second data stream, wherein:
said two or more sub-streams corresponding to the second data stream comprise a corresponding base sub-stream and at least one corresponding enhancement sub-stream; and
the controller assigns priority to each of said two or more sub-streams corresponding to the second data stream; and
two or more buffers, each of which queues data corresponding to a sub-stream before application to the transmitter, wherein at least one of said two or more buffers receives sub-stream data corresponding to each of the first and second data streams.

22. The apparatus of claim 21, wherein at least one sub-stream corresponding to the first data stream and at least one sub-stream corresponding to the second data stream have the same priority.

23. The apparatus of claim 13, wherein:
the base sub-stream is decodable independently; and
each of said enhancement sub-streams is decodable based on data contained in the base sub-stream.

24. At a receiving station in a contention-based WLAN system, apparatus that generates an output data stream corresponding to a first data stream applied to a transmitting station in said system, the apparatus comprising:
(A) a processor coupled to a receiver, the processor that generates two or more sub-streams corresponding to data received by the receiver from the transmitting station; and (B) a first device coupled to the processor to process the two or more sub-streams generated by the processor to generate the output data stream, wherein the transmitting station comprises:
(i) a second device that generates two or more sub-streams corresponding to the first data stream, wherein said two or more sub-streams corresponding to the first data stream comprise a base sub-stream and at least one enhancement sub-stream; and
(ii) a controller coupled to a transmitter, wherein:
the transmitter transmits data corresponding to the two or more sub-streams generated by the second device;
the controller (i) assigns priority to each of the two or more sub-streams generated by the second device, wherein at least two of said base and enhancement sub-streams have different priorities and (ii) applies sub-stream data to the transmitter based on the assigned priority;
the contention-based WLAN system conforms to an IEEE 802.11e standard and supports a quality of service (QoS) facility; and
the controller further:
assigns to said at least two of said base and enhancement sub-streams QoS parameter sets corresponding to at least two different access categories of the IEEE 802.11e standard;
assigns to the base sub-stream a QoS parameter set corresponding to a voice access category of the IEEE 802.11e standard;
assigns to a first enhancement sub-stream a QoS parameter set corresponding to a video access category of the IEEE 802.11e standard;
if there is a second enhancement sub-stream, then assigns to the second enhancement sub-stream a QoS parameter set corresponding to a video probe access category of the IEEE 802.11e standard; and
if there is a third enhancement sub-stream, then assigns to the third enhancement sub-stream a QoS parameter set corresponding to a best effort access category of the IEEE 802.11e standard.

25. The apparatus of claim 24, wherein:
the first and output data streams are hierarchical streams;
the second device comprises a partitioner that generates, using scalable coding, the two or more sub-streams generated by the second device; and
the first device comprises a reconstructor that combines the two or more sub-streams generated by the processor to produce the output data stream.

26. The apparatus of claim 24, wherein:
the first and output data streams are embedded streams;
the second device comprises an embedded encoder that generates the two or more sub-streams generated by the second device; and
the first device comprises an embedded decoder that processes the two or more sub-streams generated by the processor to produce the output data stream.

27. The apparatus of claim 24, wherein:
the base sub-stream is decodable independently; and
each of said enhancement sub-streams is decodable based on data contained in the base sub-stream.

28. A contention-based WLAN system, comprising a transmitting station and a receiving station, wherein:

the transmitting station:

generates two or more sub-streams corresponding to a first data stream, wherein said two or more sub-streams corresponding to the first data stream comprise a base sub-stream and at least one enhancement sub-stream;

assigns priority to each of said two or more sub-streams corresponding to the first data stream, wherein at least two of said base and enhancement sub-streams corresponding to the first data stream have different priorities; and transmits data corresponding to the two or more sub-streams corresponding to the first data stream based on the assigned priority;

the receiving station:

generates two or more sub-streams corresponding to data received from the transmitting station; and processes said two or more generated sub-streams to generate an output data stream corresponding to the first data stream;

the contention-based WLAN system conforms to an IEEE 802.11e standard and supports a quality of service (QoS) facility; and the transmitting station further:

assigns to said at least two of said base and enhancement sub-streams QoS parameter sets corresponding to at least two different access categories of the IEEE 802.11e standard;

assigns to the base sub-stream a QoS parameter set corresponding to a voice access category of the IEEE 802.11e standard;

assigns to a first enhancement sub-stream a QoS parameter set corresponding to a video access category of the IEEE 802.11e standard;

if there is a second enhancement sub-stream, then assigns to the second enhancement sub-stream a QoS parameter set corresponding to a video probe access category of the IEEE 802.11e standard; and if there is a third enhancement sub-stream, then assigns to the third enhancement sub-stream a QoS parameter set corresponding to a best effort access category of the IEEE 802.11e standard.

29. The system of claim 28, wherein:

the base sub-stream is decodable independently; and each of said enhancement sub-streams is decodable based on data contained in the base sub-stream.

\* \* \* \* \*